(12) United States Patent
Wilson et al.

(10) Patent No.: US 10,808,064 B2
(45) Date of Patent: Oct. 20, 2020

(54) AMPHIPHILIC BLOCK POLYMERS SOLUBLE IN STRONGLY SALINE MEDIUM

(71) Applicant: RHODIA OPERATIONS, Paris (FR)

(72) Inventors: David James Wilson, Coye la Foret (FR); Mikel Morvan, Pessac (FR); Max Chabert, Ivry-sur-Seine (FR); Arnaud Cadix, Saint-Ouen (FR)

(73) Assignee: RHODIA OPERATIONS, Paris (FR)

( * ) Notice: Subject to any disclaimer, the term of this patent is extended or adjusted under 35 U.S.C. 154(b) by 15 days.

(21) Appl. No.: 15/770,352

(22) PCT Filed: Oct. 21, 2016

(86) PCT No.: PCT/EP2016/075329
§ 371 (c)(1),
(2) Date: Apr. 23, 2018

(87) PCT Pub. No.: WO2017/072035
PCT Pub. Date: May 4, 2017

(65) Prior Publication Data
US 2018/0312621 A1    Nov. 1, 2018

(30) Foreign Application Priority Data

Oct. 30, 2015  (FR) ..................... 15 60435

(51) Int. Cl.
| | |
|---|---|
| *C08F 293/00* | (2006.01) |
| *C08F 212/08* | (2006.01) |
| *C09K 8/588* | (2006.01) |
| *C09K 8/68* | (2006.01) |
| *C08F 220/18* | (2006.01) |

(52) U.S. Cl.
CPC .......... *C08F 293/005* (2013.01); *C09K 8/588* (2013.01); *C09K 8/68* (2013.01); *C08F 212/08* (2013.01); *C08F 220/1812* (2020.02); *C08F 2438/03* (2013.01)

(58) Field of Classification Search
CPC .... C08F 293/00; C08F 212/08; C08F 220/56; C08F 220/585; C08F 220/1812
See application file for complete search history.

(56) References Cited

U.S. PATENT DOCUMENTS

2018/0171206 A1 * 6/2018 Cadix ................... C04B 24/163

FOREIGN PATENT DOCUMENTS

| FR | 3 018 814 A1 | 9/2015 | |
|---|---|---|---|
| WO | 2013060741 A1 | 5/2013 | |
| WO | WO-2013060741 A1 * | 5/2013 | ............ C08F 293/00 |

* cited by examiner

*Primary Examiner* — Rip A Lee

(57) ABSTRACT

The present invention relates to the preparation of polymers that are of use in particular as a rheology agent, and are suitable for use in very concentrated saline media, which comprises a step of micellar radical polymerization in which are brought into contact, in an aqueous medium: —hydrophilic monomers; —hydrophobic monomers in the form of a micellar solution, containing micelles comprising these hydrophobic monomers; —a radical polymerization initiator; and —preferably an agent for controlling radical polymerization, wherein said micelles comprise at least one surfactant of amphoteric nature. The polymers obtained according to the invention are in particular of use for enhanced oil recovery.

18 Claims, No Drawings

AMPHIPHILIC BLOCK POLYMERS SOLUBLE IN STRONGLY SALINE MEDIUM

This application is a U.S. national phase entry under 35 U.S.C. § 371 of International Application No. PCT/EP2016/075329, filed on Oct. 21, 2016, which claims priority to French Application No. 15 60435, filed on Oct. 30, 2015. The entire contents of these applications are explicitly incorporated herein by this reference.

The present invention relates to a particular polymerization process which gives access to associative amphiphilic block polymers of water-soluble type which have a high solubility in strongly saline medium, and which can typically be used in oil extraction operations involving aqueous media rich in salts (such as seawater from certain parts of the globe or else brines having high salt contents, that can range up to 30% by weight).

The polymers accessible according to the invention are of the type formed of hydrophilic (water-soluble or water-dispersible) units interrupted at various places by hydrophobic blocks. In order to obtain polymers of this type which include hydrophobic blocks, a known method is the one termed "micellar radical polymerization", examples of which have in particular been described in patent U.S. Pat. No. 4,432,881 or else in *Polymer*, vol. 36, No 16, pp. 3197-3211 (1996), to which reference may be made for further details regarding the micellar radical polymerization technique.

According to the above-mentioned particular technique of micellar radical polymerization, which will be referred to in the rest of the description as "micellar polymerization" for the purposes of brevity, block polymers of multiblock type are synthesized by copolymerization of hydrophilic monomers and hydrophobic monomers in an aqueous dispersing medium (typically water or a water/alcohol mixture) which comprises:

hydrophilic monomers in the dissolved or dispersed state in said medium;
and
hydrophobic monomers in surfactant micelles formed in said medium by introducing therein this surfactant at a concentration above its critical micelle concentration (cmc).

In micellar polymerization, the hydrophobic monomers present in the micelles are said to be in "micellar solution". The micellar solution to which reference is made is a micro-heterogeneous system which is generally isotropic, optically transparent and thermodynamically stable. According to one particular embodiment, the monomers contained in the micelles can have a surfactant nature and can provide at least one part of the stabilisation of the micelle; in this case, reference is made, in the broad sense, to "self-micellizable monomers" (whether they are suitable by themselves for stabilizing the micelles or else only in combination with surfactants).

It should be noted that a micellar solution of the type employed in micellar polymerization should be distinguished from a microemulsion. In particular, in contrast to a microemulsion, a micellar solution is formed at any concentration exceeding the critical micelle concentration of the surfactant employed, with the sole condition that the hydrophobic monomer be soluble at least to a certain extent within the internal space of the micelles. A micellar solution furthermore differs from an emulsion due to the absence of homogeneous internal phase: the micelles contain a very small number of molecules (typically less than 1000, generally less than 500 and typically from 1 to 100, with most often 1 to 50, monomers, and at most a few hundred surfactant molecules, when a surfactant is present) and the micellar solution generally has physical properties similar to those of the monomer-free surfactant micelles. Moreover, generally, a micellar solution is transparent with respect to visible light, given the small size of the micelles, which does not result in refraction phenomena, unlike the drops of an emulsion, which refract light and give it its characteristic cloudy or white appearance.

The micellar polymerization technique results in characteristic block polymers which each comprise several hydrophobic blocks of substantially the same size and where this size can be controlled. Specifically, given the confinement of the hydrophobic monomers in the micelles, each of the hydrophobic blocks formed, of controlled size, contains substantially a defined number $n_H$ of hydrophobic monomers, this number $n_H$ being able to be calculated as follows (Macromolecular Chem. Physics, 202, 8, 1384-1397, 2001):

$$n_H = N_{agg} \cdot [M_H]/([\text{surfactant}] - \text{cmc})$$

wherein:

$N_{agg}$ is the aggregation number of the surfactant, which reflects the surfactant number present in each micelle
$[M_H]$ is the molar concentration of hydrophobic monomer in the medium
[surfactant] is the molar concentration of surfactant in the medium and
cmc is the critical micelle (molar) concentration.

The micellar polymerization technique thus makes possible advantageous control of the hydrophobic units introduced into the polymers formed, namely:

overall control of the molar fraction of hydrophobic units in the polymer (by adjusting the ratio of the concentrations of the two monomers); and
more specific control of the number of hydrophobic units present in each of the hydrophobic blocks (by modifying the parameters influencing the $n_H$ defined above).

The multiblock polymers obtained by micellar polymerization also have an associative nature, which makes them, in absolute terms, good candidates for applications as viscosity enhancers.

That said, while micellar polymerization does indeed make it possible, in the most general case, to integrate hydrophobic blocks of controlled size into hydrophilic chains, which makes it possible to synthesize self-associative polymers, it does not make it possible, in general, to control the overall size of the polymers synthesized or the microstructure of these polymers, which does not allow fine control of the properties of these self-associative polymers. Moreover, the absence of control of the microstructure does not make it possible to sufficiently finely adjust the properties of the polymers synthesized by micellar polymerization. Furthermore, it prevents access to copolymers of controlled architecture. In addition, micellar polymerization processes are generally limited to extremely dilute systems to enable the addition and mixing of the reagents. The molecular weights obtained in micellar radical polymerization are generally of the order of 500 000 to 5 000 000 g/mol, for example from 500 000 to 3 000 000.

However a specific micellar polymerisation process carried out in the presence of a radical polymerisation control agent, which makes it possible to retain the advantages of micellar polymerisation while the same time avoiding the above-mentioned problems, has been described in application WO 2013/060741.

An objective of the present invention is to provide block polymers which have the advantages of micellar polymerisation, and more preferentially those described in the abovementioned application WO 2013/060741, and which can also, more specifically, be easily dispersed or dissolved in strongly saline medium.

More specifically, the invention is directed toward providing a product which gives access to compositions of polymers which:

i. comprise hydrophobic blocks of controlled size, of the type such as those obtained by usual micellar polymerization, with preferably a control of the average molecular weight of the chains synthesized and of the microstructure of the polymers, namely a homogeneity, from one polymer chain to another, of the distribution of the hydrophobic blocks within the hydrophilic backbone;

and ii. are dispersible in an aqueous medium comprising up to 50 g/l of salt, preferably comprising up to 100 g/l of salts, and more advantageously up to 200 g/l of salts, or even more, this being without polymer precipitation effect, and this preferably being without formation of any turbidity detectable to the eye.

To this end, according to a first aspect, one subject of the present invention is a process for preparing a block copolymer, which comprises a step (E) of micellar radical polymerization in which the following are placed in contact, in an aqueous medium (M):

hydrophilic monomers, dissolved or dispersed in said aqueous medium (M);

hydrophobic monomers in the form of a micellar solution, i.e. a solution containing, in dispersed form in the medium (M), micelles comprising these hydrophobic monomers;

at least one radical polymerization initiator, this initiator typically being water-soluble or water-dispersible; and preferably at least one radical polymerization control agent, wherein said micelles comprise at least one surfactant of amphoteric nature, preferably of betaine or sultaine type.

According to another aspect, the invention also relates to the polymer compositions of the type obtained according to the process comprising the step (E) carried out under the abovementioned conditions, and also the polymers which are contained in these compositions, wherein they are in combination with the surfactants used during the radical polymerization.

The inventors have now discovered that, for a controlled micellar polymerisation process of the type described in application WO 2013/060741 carried out with a particular surfactant, namely a surfactant of amphoteric type, the polymer composition obtained at the end of the polymerisation, which contains the surfactants used during the micellar polymerisation, has a particularly high solubility.

The polymers obtained using amphoteric surfactants according to the invention prove to be in particular much more soluble in strongly saline medium than the polymers obtained under the same conditions but using the surfactant most commonly used (and as it were the only one in practice), namely sodium dodecyl sulfate (SDS). More generally, the use of amphoteric surfactants according to the invention improves the properties of dissolution of the polymer compositions obtained compared with the use of an anionic surfactant used without amphoteric surfactant.

The aqueous medium (M) used in step (E) of the process of the invention is a medium comprising water, preferably in a proportion of at least 50% by weight, or even at least 80%, for example at least 90%, or even at least 95%. This aqueous medium may optionally comprise solvents other than water, for example a water-miscible alcohol. Thus, the medium (M) may be, for example, an aqueous-alcoholic mixture. According to one possible variant, the medium (M) may comprise other solvents, preferably in a concentration in which said solvent is water-miscible, which may especially make it possible to reduce the amount of stabilizing surfactants used. Thus, for example, the medium (M) may comprise pentanol, or any other additive for adjusting the aggregation number of the surfactants. In general, it is preferable for the medium (M) to be a continuous phase of water consisting of one or more solvents and/or additives that are miscible with each other and in water in the concentrations at which they are used.

The micellar radical polymerization carried out in step (E), when it is carried out in the presence of a radical polymerization control agent, allows, in addition to the advantages generally observed in micellar polymerization (namely the control of the molar fraction of hydrophobic units in the polymers; and (ii) control of the number of hydrophobic units in each hydrophobic block):

control of the average molecular weight; and control of the distribution of the hydrophobic blocks in the various chains; and production of polymer chains of living nature, offering the possibility of preparing complex polymers of controlled architecture.

Furthermore, the polymers obtained under the conditions of the present invention in the presence of a radical polymerisation control agent have a controlled structure, and their average molar mass can be finely controlled. These polymers have a specific structure, namely they are, schematically, based on a backbone formed from hydrophilic units (water-soluble or water-dispersible units) interrupted at various places with small hydrophobic blocks, these hydrophobic blocks all being of substantially identical size and present substantially in the same number and proportion on all the polymer chains.

For the purposes of the present description, the term "radical polymerization control agent" is intended to mean a compound which is capable of extending the lifetime of the growing polymer chains in a polymerization reaction and of conferring, on the polymerization, a living or controlled nature. This control agent is typically a reversible transfer agent as employed in controlled radical polymerizations denoted under the terminology RAFT or MADIX, which typically employ a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

According to an advantageous embodiment, it is possible to use, in step (E), a radical polymerization control agent used in step (E) which is a compound which comprises a thiocarbonylthio —S(C=S)— group. Thus, for example, it may be a compound which comprises a xanthate group (bearing —SC=S—O— functions), for example a xanthate. Other types of control agent may be envisaged (for example of the type of these used in CRP or in ATRP). Typically, use is made of an oligomer of this type which (i) is soluble or dispersible in the aqueous medium (M) used in step (E); and/or (ii) is not suitable for penetrating into the micelles of the micellar solution.

According to one particular embodiment, it is possible to use, in step (E), as control agent, a polymer chain derived from a controlled radical polymerization and bearing a group that is suitable for controlling a radical polymerization (polymer chain of "living" type, of a type well known per se). Thus, for example, the control agent can be a polymer chain (preferably hydrophilic or water-dispersible) functionalized at the chain end with a xanthate group or more generally comprising an —SC=S— group, for example obtained according to the MADIX technology.

Alternatively, it is possible to use, in step (E), as control agent, a non-polymer compound bearing a group that ensures control of the radical polymerization, especially a thiocarbonylthio —S(C=S)— group.

According to one particular variant, it is possible to use, in step (E), as control agent, a polymer, advantageously an oligomer, of water-soluble or water-dispersible nature and bearing a thiocarbonylthio group —S(C=S)—, for example a xanthate —SC=S—O— group. This polymer, which is capable of acting both as control agent for the polymerization and as monomer in step (E), is also denoted by "prepolymer" in the rest of the description. Typically, this prepolymer is obtained by radical polymerization of hydrophilic monomers in the presence of a control agent bearing a thiocarbonylthio —S(C=S)— group, for example a xanthate. Thus, for example, according to an advantageous embodiment which is illustrated at the end of the present description, the control agent used in step (E) may advantageously be a prepolymer bearing a thiocarbonylthio —S(C=S)— group, for example a xanthate —SC=S—O— group, obtained on conclusion of a step $(E^0)$ of controlled radical polymerization prior to step (E). In this step $(E^0)$, hydrophilic monomers, advantageously identical to those employed in step (E); a radical polymerization initiator and a control agent bearing a thiocarbonylthio —S(C=S)— group, for example a xanthate, can typically be brought into contact.

The use of the abovementioned step $(E^0)$ prior to step (E) makes it possible, schematically, to hydrophilize a large number of control agents carrying thiocarbonylthio functional groups (for example xanthates, which are rather hydrophobic by nature), by converting them from the prepolymers which are soluble or dispersible in the medium (M) of step (E). Preferably, a prepolymer synthesized in step $(E^0)$ has a short polymer chain, for example comprising a series of less than 50 monomer units, indeed even less than 25 monomer units, for example between 2 and 15 monomer units.

When it is carried out in the presence of a radical polymerisation control agent, step (E) makes it possible to combine the advantages both of controlled radical polymerisation and of micellar polymerisation. Within this context, it should be noted that the presence of the micelles in the polymerization medium does not affect the action of the control agents, which make it possible to perform a controlled polymerization of the monomers present in the aqueous medium in a similar manner to a controlled radical polymerization performed in homogeneous medium, thus making it possible very readily to predict and control the average molar mass of the synthesized polymer (this mass is proportionately higher the lower the initial concentration of control agent in the medium, this concentration dictating the number of growing polymer chains). At the same time, the presence of the control agent is not detrimental to the advantageous effect observed in polymerization either, namely the precise control of the size of the hydrophobic blocks.

The implementation of step (E) of the process of the invention, in particular in the presence of a radical polymerisation control agent, also makes it possible to obtain polymers of both large and controlled size. Thus, the size of the polymers obtained is larger than the maximum sizes that it is known how to obtain when using methods of controlled radical polymerisation or of micellar radical polymerisation in the absence of control agents. Furthermore, under the conditions of step (E), it proves possible to control the number-average molar mass of the polymers up to very high values According to one particular embodiment, the polymers synthesized according to the process of the invention can have a molecular weight of greater than 300 000 g/mol. In particular, by adjusting the initial concentration of control agent in the medium (M), step (E) may typically lead to the synthesis of a block polymer having a molecular weight Mn of greater than 400 000 g/mol. According to an advantageous embodiment of the process of the invention, in step (E), the initial concentration of control agent in the medium is chosen such that the synthesized hydrophilic polymer block average molecular weight has a number-average molecular weight Mn of greater than or equal to 500 000 g/mol, for example between 500 000 and 1 000 000 g/mol, sizes of up to 2 000 000 possibly being achieved.

The process of the invention alternatively makes it possible to prepare polymers of lower weights. According to an advantageous embodiment, the synthesized polymer is a polymer with a weight of between 1000 and 100 000 g/mol and preferably between 2000 and 25 000 g/mol. Typically, such low-weight polymers can be used at a concentration lower than their critical overlap concentration. On account of their small sizes, such polymers can diffuse at the interfaces and participate in modifying the properties of these interfaces or surfaces.

Irrespective of the size of the polymers synthesized, when step (E) is carried out in the presence of a radical polymerisation control agent, the polymers obtained also have a highly controlled microstructure, with chains that are substantially all similar, comprising hydrophobic blocks substantially distributed in the same manner from one polymer chain to another. This homogeneity of the distribution of the hydrophobic blocks from one chain to another makes it possible to obtain a polymer population all having similar properties, which makes it possible to provide compositions having perfectly targeted and reproducible properties, which constitute an advantage for certain applications of the polymers, for example when it is sought to use them to obtain a precisely metered viscosity-enhancing effect. The polymer is obtained according to the invention differ in that respect from the polymer is generally obtained in micellar polymerisation, which usually have a very broad and very heterogeneous dispersion of the distribution of the hydrophobic blocks within the various chains.

Thus, the implementation of step (E) affords access to particularly advantageous polymers. Given the implementation of the conditions of step (E), these polymers usually have a linear structure, with hydrophobic blocks localized on a monotonous gradient, i.e. of constantly decreasing or constantly increasing concentration from the start to the end of the polymer chain in formation, which is especially explained by the fact that the hydrophobic monomers present in the micellar solution become depleted over time.

The polymers obtained according to the present invention may be used in many fields. They may be used most particularly as surfactants and/or rheology modifiers, especially as viscosity enhancers or thickeners, in particular in aqueous media.

The compositions as obtained at the end of the micellar polymerisation of the invention, which comprise the abovementioned polymers in combination with the surfactants used in step (E), including at least one amphoteric surfactant, are suitable for use in strongly saline medium. They are also suitable for media with a lower salinity, which confers on them a good modularity in terms of salinity.

According to a third aspect, a subject of the invention is also the abovementioned uses of the polymer compositions and specific polymers obtained according to the invention, in particular the use of the polymer compositions in aqueous media comprising at least 50 g/l of salts, advantageously at least 100 g/l of salts, or even at least 150 g/l of salts, for example up to 300 g/l of salts. A subject of the invention is also processes for modifying aqueous media using these polymer compositions and polymers as rheology modifiers.

The invention also relates to the aqueous compositions comprising the polymers according to the invention, which can in particular be used for the exploitation of oil and/or gas deposits. A subject of the invention is also the methods using aqueous compositions of this type for the exploitation of oil and/or gas deposits, in particular the methods using circulation or placement of such a composition in a well. The invention relates in particular to the use of the aqueous compositions comprising the polymers according to the invention, and of said polymers, for performing an oil extraction operation, in particular a stimulating operation (in particular a fracking operation) or else an enhanced oil recovery (EOR) operation.

Various features and embodiments of the invention will now be described in greater detail.

The Radical Polymerization Control Agent

The control agent which can advantageously be used in step (E) and, where appropriate, in step (E⁰) of the process of the invention is advantageously a compound bearing a thiocarbonylthio —S(C=S)— group. According to a specific embodiment, the control agent can carry several thiocarbonylthio groups. It can optionally be a polymer chain carrying such a group.

Thus, this control agent can, for example, correspond to the formula (A) below:

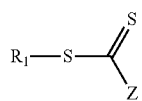

(A)

in which:

Z represents:
- a hydrogen atom,
- a chlorine atom,
- an optionally substituted alkyl or optionally substituted aryl radical,
- an optionally substituted heterocycle,
- an optionally substituted alkylthio radical,
- an optionally substituted arylthio radical,
- an optionally substituted alkoxy radical,
- an optionally substituted aryloxy radical,
- an optionally substituted amino radical,
- an optionally substituted hydrazine radical,
- an optionally substituted alkoxycarbonyl radical,
- an optionally substituted aryloxycarbonyl radical,
- an optionally substituted acyloxy or carboxyl radical,
- an optionally substituted aroyloxy radical,
- an optionally substituted carbamoyl radical,
- a cyano radical,
- a dialkyl- or diarylphosphonato radical,
- a dialkyl-phosphinato or diaryl-phosphinato radical, or
- a polymer chain, and $R_1$ represents:
- an optionally substituted alkyl, acyl, aryl, aralkyl, alkene or alkyne group,
- a saturated or unsaturated, aromatic, optionally substituted carbocycle or heterocycle, or
- a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—O₂CR), carbamoyl (—CONR₂), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR₂), halogen, perfluoroalkyl $C_nF_{2n+1}$, allyl, epoxy, alkoxy (—OR), S-alkyl, S-aryl, groups of hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

For the control agents of formula (A) that can be used in step (E), it is generally preferred for the group $R_1$ to be of hydrophilic nature. Advantageously, it is a water-soluble or water-dispersible polymer chain.

The group $R_1$ may alternatively be amphiphilic, i.e. it may have both hydrophilic and lipophilic nature. It is preferable for $R_1$ not to be hydrophobic.

As regards the control agents of formula (A) used in step (E⁰), $R_1$ may typically be a substituted or unsubstituted, preferably substituted, alkyl group. A control agent of formula (A) used in step (E⁰) may nevertheless comprise other types of groups $R_1$, in particular a ring or a polymer chain.

The optionally substituted alkyl, acyl, aryl, aralkyl or alkyne groups generally exhibit from 1 to 20 carbon atoms, preferably from 1 to 12 and more preferably from 1 to 9 carbon atoms. They can be linear or branched. They may also be substituted with oxygen atoms, in particular in the form of esters, sulfur atoms or nitrogen atoms.

Among the alkyl radicals, mention may be made especially of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they bear at least one acetylenic unsaturation, such as the acetylenyl radical.

The acyl group is a radical generally containing from 1 to 20 carbon atoms with a carbonyl group.

Among the aryl radicals, mention may be made especially of the phenyl radical, which is optionally substituted, in particular with a nitro or hydroxyl function.

Among the aralkyl radicals, mention may be made especially of the benzyl or phenethyl radical, which is optionally substituted, in particular with a nitro or hydroxyl function.

When $R_1$ or Z is a polymer chain, this polymer chain may result from a radical or ionic polymerization or from a polycondensation.

Advantageously, use is made, as control agent for step (E) and also for step (E⁰), if appropriate, of compounds carrying a xanthate —S(C=S)O—, trithiocarbonate, dithiocarbamate or dithiocarbazate functional group, for example carrying an O-ethyl xanthate functional group of formula —S(C=S)OCH₂CH₃.

When step (E⁰) is carried out, it is in particular advantageous to employ, as control agent in this stage, a compound chosen from xanthates, trithiocarbonates, dithiocarbamates and dithiocarbazates. Xanthates prove to be very particularly advantageous, in particular those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$))S(C=S)OEt. Another possible control agent in step (E⁰) is dibenzyl trithiocarbonate of formula PhCH$_2$S(C=S)SCH$_2$Ph (where Ph=phenyl).

The living prepolymers obtained in step (E⁰) by using the abovementioned control agents prove to be particularly advantageous for performing step (E).

The Hydrophilic Monomers

The process of the invention may be employed with a very large number of hydrophilic monomers.

Typically, the monomers may comprise monomers chosen from:
- ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
- esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
- α,β-ethylenically unsaturated monocarboxylic acid amides and the N-alkyl and N,N-dialkyl derivatives thereof, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)acrylamide, and metholylacrylamide (acrylamide and N,N-dimethyl(meth)acrylamide prove to be in particular advantageous);
- N-vinyllactams and derivatives thereof, for example N-vinylpyrrolidone and N-vinylpiperidone;
- open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;
- esters of α,β-ethylenically unsaturated monocarboxylic and dicarboxylic acids with aminoalcohols, for example N,N-dimethylaminomethyl (meth)acrylate, N,N-dimethylaminoethyl (meth)acrylate, N,N-diethylaminoethyl acrylate, and N,N-dimethylaminopropyl (meth)acrylate;
- amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide and N-[4-(dimethylamino)butyl]methacrylamide;
- N-diallylamines, N,N-diallyl-N-alkylamines, acid-addition salts thereof and quaternization products thereof, the alkyl used here preferentially being C$_1$-C$_3$-alkyl;
- N,N-diallyl-N-methylamine and N,N-diallyl-N,N-dimethylammonium compounds, for example the chlorides and bromides;
- nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and their salts;
- sulfobetaines; and
- mixtures and combinations of two or more of the abovementioned monomers.

According to a particular embodiment, these monomers may especially comprise acrylic acid (AA). According to a possible embodiment, the monomers are all acrylic acids, but it may also be envisioned to use as monomers a mixture comprising, inter alia, acrylic acid as a mixture with other hydrophilic monomers.

According to a preferential embodiment, the hydrophilic monomers of step (E) comprise (meth)acrylic acid and/or (meth)acrylamido monomers.

For the purposes of the present description, the term "(meth)acrylic acid" includes methacrylic acid and acrylic acid, and mixtures thereof.

Similarly, for the purposes of the present description, the term "(meth)acrylate" includes methacrylate and acrylate, and mixtures thereof.

Similarly, for the purposes of the present description, the term "(meth)acrylamide/(meth)acrylamido" includes methacrylamide/methacrylamido and acrylamide/acrylamido, and mixtures thereof.

The monomers containing acid groups may be used for the polymerization in the form of the free acid or in partially or totally neutralized form. KOH, NaOH, ammonia or another base may be used, for example, for the neutralization.

According to another particular embodiment, the monomers used in the process of the invention are especially acrylic acid, methacrylic acid and/or salts thereof, and/or mixtures thereof.

According to another embodiment, the monomers used in step (E) comprise (and typically consist of) (meth)acrylamide monomers, or more generally (meth)acrylamido monomers, including:
- acrylamido monomers, namely acrylamide, the sulfonate derivative thereof (AMPS), the quaternary ammonium (APTAC) and sulfopropyl dimethylammonium propyl acrylamide;
- methacrylamido monomers, such as sulfopropyldimethylammoniopropylmethacrylamide (SPP) or sulfohydroxypropyldimethylammoniopropylmethacrylamide.

According to a particular embodiment, the monomers of step (E) are acrylamides. An acrylamide used in step (E) is preferably an acrylamide that is not stabilized with copper. In the event of copper being present, it is preferable to introduce a copper-complexing agent such as EDTA, where appropriate preferably to a proportion of 20 to 2000 ppm. When acrylamides are used in step (E), they may typically be used in the form of powder or of an aqueous solution (optionally, but not necessarily, stabilized with hydroquinone monomethyl ether HQME, or alternatively with copper salts (preferably supplemented with EDTA, where appropriate)).

Irrespective of their exact nature, the monomers of step (E) may be used at relatively high concentrations, typically at concentrations that would be sufficient to ensure the formation of gel if step (E) were performed in the absence of a control agent. The inventors have now demonstrated, surprisingly, that the polymerization of step (E) can, if need be, be performed under conditions which correspond to that of gel polymerization, and without necessarily leading to gelation of the reaction medium during the polymerization, due to the presence of the control agent. Whether or not gelation of the medium is observed, step (E) allows a polymerization of controlled type, unlike a polymerization performed without an additional control agent.

Typically, the initial monomer concentration in the reaction medium of step (E) may range up to 40% by mass, or even up to 50% by mass, this concentration generally remaining less than 30% by mass relative to the total mass of the reaction medium. For example, the initial monomer concentration in the reaction medium of step (E) is between 0.5% and 35% and especially between 1% and 20% by mass relative to the total mass of the reaction medium.

According to a specific embodiment, the hydrophilic monomers used in step (E) are heat-sensitive macromonomers, which are insoluble in water beyond a certain temperature (the cloud point), but are soluble at lower temperature, step (E) being performed at a temperature below the cloud point. Macromonomers of this type typically have a polymerizable function of acrylamido type, and a side chain composed of ethylene oxide or propylene oxide sequences (random or in blocks), or alternatively based on N-isopropylacrylamide or N-vinylcaprolactam. This embodiment especially gives access to the preparation of polymers having heat-thickening properties, which may be used, for example, in the petroleum industry.

Preferably, in step (E), all the hydrophilic monomers are dissolved and/or dispersed in the aqueous medium (M).

Hydrophobic Monomers

These monomers, used in step (E) in the form of a micellar solution, i.e. containing, in dispersed form in the medium (M), micelles comprising these hydrophobic monomers. Provided that they can be incorporated into micelles of this type, any monomer of hydrophobic nature may be envisioned in step (E).

As nonlimiting examples of hydrophobic monomers that may be used according to the invention, mention may be made especially of:

vinylaromatic monomers, such as styrene, α-methylstyrene, para-chloromethylstyrene, vinyltoluene, 2-methylstyrene, 4-methylstyrene, 2-(n-butyl)styrene or 4-(n-decyl)styrene (t-butylstyrene proves to be most particularly advantageous);

halogenated vinyl compounds, such as vinyl or vinylidene halides, for example vinyl or vinylidene chlorides or fluorides, corresponding to the formula $R_b R_c C = CX^1 X^2$, wherein: $X^1$=F or Cl
$X^2$=H, F or Cl
each one of $R_b$ and $R_c$ represents, independently:
H, Cl, F; or
an alkyl group, preferably chlorinated and/or fluorinated, more advantageously perchlorinated or perfluorinated;

esters of α,β-ethylenically unsaturated monocarboxylic or dicarboxylic acid with $C_2$-$C_{30}$ alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linolyl (meth)acrylate, linolenyl (meth)acrylate, stearyl (meth)acrylate, lauryl (meth)acrylate and mixtures thereof;

esters of vinyl or allyl alcohol with $C_1$-$C_{30}$ monocarboxylic acids, for example vinyl formate, vinyl acetate, vinyl propionate, vinyl butyrate, vinyl laurate, vinyl stearate, vinyl propionate or vinyl versatate, and mixtures thereof;

ethylenically unsaturated nitriles, such as acrylonitrile or methacrylonitrile, and mixtures thereof;

esters of α,β-ethylenically unsaturated monocarboxylic and dicarboxylic acids with $C_3$-$C_{30}$ alkanediols, for example 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;

primary amides of α,β-ethylenically unsaturated monocarboxylic and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachinyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linolyl(meth)acrylamide, N-linolenyl(meth)acrylamide, N-stearyl(meth)acrylamide and N-lauryl(meth)acrylamide;

N-vinyllactams and derivatives thereof, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;

esters of α,β-ethylenically unsaturated monocarboxylic and dicarboxylic acids with amino alcohols, for example N,N-dimethylaminocyclohexyl (meth)acrylate;

amides of α,β-ethylenically unsaturated mono- and dicarboxylic acids with diamines comprising at least one primary or secondary amino group, for example N-[4-(dimethylamino)butyl]acrylamide, N-[4-(dimethylamino)butyl]methacrylamide, N-[2-(dimethylamino)ethyl]acrylamide, N-[4-(dimethylamino)cyclohexyl]acrylamide, N-[4-(dimethylamino)cyclohexyl]methacrylamide; and $C_2$-$C_8$ monoolefins and nonaromatic hydrocarbons comprising at least two conjugated double bonds, for example ethylene, propylene, isobutylene, isoprene or butadiene.

According to a preferred embodiment, the hydrophobic monomers employed according to the invention can be chosen from:

$C_1$-$C_{30}$ alkyl and preferably $C_4$-$C_{22}$ alkyl α,β-unsaturated esters, in particular alkyl acrylates and methacrylates, such as methyl, ethyl, butyl, 2-ethylhexyl, isooctyl, lauryl, isodecyl or stearyl acrylates and methacrylates (lauryl methacrylate in particular proves to be most especially advantageous);

$C_1$-$C_{30}$ alkyl and preferably $C_4$-$C_{22}$ alkyl α,β-unsaturated amides, in particular alkylacrylamides and alkylmethacrylamides, such as methyl-, ethyl-, butyl-, 2-ethylhexyl-, isooctyl-, lauryl-, isodecyl- or stearylacrylamide and methacrylamide;

vinyl or allyl alcohol esters of saturated carboxylic acids, such as vinyl or allyl acetate, propionate, versatate or stearate;

α,β-unsaturated nitriles containing from 3 to 12 carbon atoms, such as acrylonitrile or acrylonitrile;

α-olefins and conjugated dienes;

mixtures and combinations of two or more of the above-mentioned monomers.

Preferably, the micelles of the micellar solution of step (E) do not contain any monomers of hydrophilic or water-dispersible nature. Moreover, preferably, all the hydrophobic monomers used in step (E) are contained in micelles of the micellar solution.

According to one possible embodiment, the monomers contained in the micelles of the micellar solution can be monomers of surfactant nature, referred to as of "self-micellizable" type, suitable for partly stabilizing the micelles which contain them Initiation and Implementation of the Radical Polymerizations of Steps (E) and (E⁰)

When it is employed in step (E), the radical polymerization initiator is preferably water-soluble or water-dispersible. Apart from this preferential condition, any radical polymerization initiator (source of free radicals) known per se and suited to the conditions chosen for these stages can be employed in step (E) and step (E⁰) of the process of the invention.

Thus, the radical polymerization initiator employed according to the invention can, for example, be chosen from the initiators conventionally used in radical polymerization. It can, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] or 2,2'-azobis(isobutyramide) dihydrate, redox systems comprising combinations, such as:

mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

Typically, the amount of initiator to be used is preferably determined so that the amount of radicals generated is at most 50 mol % and preferably at most 20 mol %, relative to the amount of control agent or transfer agent.

Very particularly in step (E), it generally proves to be advantageous to use a radical initiator of redox type, which exhibits, inter alia, the advantage of not requiring heating of the reaction medium (no thermal initiation), and the inventors of which have in addition now discovered that it proves to be suitable for the micellar polymerization of step (E).

Thus, the radical polymerization initiator employed in step (E) can typically be a redox initiator, typically not requiring heating for its thermal initiation. It is typically a mixture of at least one oxidizing agent with at least one reducing agent.

The oxidizing agent present in this redox system is preferably a water-soluble agent. This oxidizing agent may be chosen, for example, from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or else potassium bromate.

The reducing agent present in the redox system is also preferably a water-soluble agent. This reducing agent may typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:

mixtures of water-soluble persulfates with water-soluble tertiary amines, mixtures of water-soluble bromates (for example, alkali metal bromates) with water-soluble sulfites (for example, alkali metal sulfites), mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

An advantageous redox system comprises (and preferably consists of) the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of step (E) to be free of copper. In the case of the presence of copper, it is generally desirable to add a copper-complexing agent, such as EDTA, in an amount capable of masking its presence.

Irrespective of the nature of the initiator used, the radical polymerization of step ($E^0$) may be performed in any appropriate physical form, for example in solution in water or in a solvent, for example an alcohol or THF, in emulsion in water ("latex" process) or in bulk, where appropriate while controlling the temperature and/or the pH in order to render species liquid and/or soluble or insoluble.

After performing step (E), given the specific use of a control agent, polymers functionalized with transfer groups (living polymers) are obtained. This living character makes it possible, if desired, to use these polymers in a subsequent polymerization reaction, according to a technique that is well known per se. Alternatively, if required, it is possible to deactivate or to destroy the transfer groups, for example by hydrolysis, ozonolysis or reaction with amines, according to means known per se. Thus, according to a specific embodiment, the process of the invention can comprise, after step (E), a step (E1) of hydrolysis, of ozonolysis or of reaction with amines which is capable of deactivating and/or destroying all or a portion of the transfer groups present on the polymer prepared in step (E).

Surfactants

To prepare the micellar solution of the hydrophobic monomers used in step (E), use may be made of any suitable surfactant or surfactant mixture comprising at least one amphoteric surfactant.

The amphoteric surfactant used according to the present invention may be a surfactant or a mixture of surfactants selected both from "true amphoteric" surfactants and from "zwitterionic" surfactants.

In particular, the amphoteric surfactant used according to the present invention may be selected from:
surfactants containing a permanent ionic group (this ionic group typically being a group which remains cat ionic in nature regardless of the pH, such as a quaternary ammonium) and a potentially ionic group of opposite charge (typically a group which, depending on the pH, is non-charged or anionic, such as a carboxy group); and/or
surfactants comprising two potentially ionic groups of opposite charges (namely a group which, depending on the pH, is non-charged or anionic, such as a carboxy; and a group which, depending on the pH, is non-charged or cationic, such as an amine group).

The amphoteric surfactant used according to the present invention may in particular be selected from:
betaines, in particular carboxybetaines such as cetyl betaine (and in particular the one available under the name Mackam CET from the company Solvay), lauryl betaine (Mirataine BB available from the company Solvay), octylbetaine or cocobetaine (Mirataine BB-FLA available from the company Solvay); amidoalkylbetaines, such as cocamidopropyl betaine (CAPB) (Mirataine BDJ available from the company Solvay or Mirataine BET C-30 available from the company Solvay); or alternatively the betaine compositions available under the names Mackam LAB and Mackam CBS from the company Solvay;
sulfobetaines (also known as "sultaines") such as cocamidopropyl hydroxy sultaine (in particular Mirataine CBS available from the company Solvay);
alkylamphoacetates and alkylamphodiacetates, such as, for example, comprising a cocoyl or lauryl chain (Miranol C2M Conc. NP, C32, L32 in particular, available from the company Solvay);
alkylamphopropionates or alkylamphodipropionates (Miranol C2M SF);
alkyl amphohydroxypropyl sultaines (Miranol CS);
iminopropinates;
alkyl amine oxides, for example lauramine oxide (INCI); and
mixtures of surfactants comprising one or more of the abovementioned compounds.

Betaines and sultaines, inter alia, our amphoteric surfactants which prove to be particularly suitable for the implementation of step (E) of the present invention.

Cetyl betaine, in particular, is an advantageous amphoteric surfactant, which is most especially suitable in particular when the hydrophobic monomers comprise t-butyl styrene or alternatively lauryl (meth)acrylate. Alternatively, Mackam LAB is also a good candidate.

Optionally, in addition to the abovementioned amphoteric surfactants, use may optionally be made of other surfactants, of anionic, cationic or nonionic type, although the presence of surfactants is not absolutely required according to the invention.

Thus, according to one particular embodiment, the micellar solution used in step (E) does not comprise SDS, and preferably comprises no anionic surfactant. According to a more specific embodiment, the micellar solution used in step (E) does not comprise a non-amphoteric surfactant.

According to another embodiment, the micellar solution used in step (E) can comprise an additional non-amphoteric surfactant, preferably selected from the following nonlimiting list:

The anionic surfactants may be selected from:
alkyl ester sulfonates, for example of formula R—CH(SO$_3$M)—CH$_2$COOR', or alkyl ester sulfates, for example of formula R—CH(OSO$_3$M)-CH$_2$COOR', where R represents a $C_5$-$C_{20}$ and preferably $C_{10}$-$C_{16}$ alkyl radical, R' represents a $C_1$-$C_6$ and preferably $C_1$-$C_3$ alkyl radical and M represents an alkaline earth metal cation, for example the sodium cation, or the ammonium cation. Mention may very particularly be made of methyl ester sulfonates, the R radical of which is a $C_{14}$-$C_{16}$ radical;
alkylbenzenesulfonates, more particularly $C_9$-$C_{20}$ alkylbenzenesulfonates, primary or secondary alkylsulfonates, in particular $C_5$-$C_{22}$ alkylsulfonates, or alkylglycerolsulfonates;
alkyl sulfates, for example of formula ROSO$_3$M, where R represents a $C_{10}$-$C_{24}$ and preferably $C_{12}$-$C_{20}$ alkyl or hydroxyalkyl radical and M represents a cation with the same definition as above;
alkyl ether sulfates, for example of formula RO(OA)$_n$SO$_3$M, where R represents a $C_{10}$-$C_{24}$ and preferably $C_{12}$-$C_{20}$ alkyl or hydroxyalkyl radical, OA represents an ethoxylated and/or propoxylated group, M represents a cation with the same definition as above and n generally ranges from 1 to 4, for instance lauryl ether sulfate with n=2;

alkylamide sulfates, for example of formula RCONHR'OSO$_3$M, where R represents a C$_2$-C$_{22}$ and preferably C$_6$-C$_{20}$ alkyl radical, R' represents a C$_2$-C$_3$ alkyl radical and M represents a cation with the same definition as above, and also the polyalkoxylated (ethoxylated and/or propoxylated) derivatives thereof (alkylamide ether sulfates);

salts of saturated or unsaturated fatty acids, for example such as C$_5$-C$_{24}$ and preferably C$_{14}$-C$_{20}$ fatty acids, and of an alkaline earth metal cation, N-acyl-N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;

monoester and diester phosphates, for example having the following formula: (RO)$_x$—P(=O)(OM)$_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline-earth metal cation;

The nonionic surfactants may be selected from:

alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl)phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide the compound resulting from the condensation of propylene oxide with ethylenediamine, such as the Tetronic products sold by BASF, alkylpolyglycosides, such as those described in U.S. Pat. No. 4,565,647, or alkylglucosides, or fatty acid amides, for example C$_5$-C$_{20}$ fatty acid amides, in particular fatty acid monoalkanolamides, for example cocamide MEA or cocamide MIPA;

The cationic surfactants may be optionally polyethoxylated primary, secondary or tertiary fatty amine salts, quaternary ammonium salts, such as tetraalkylammonium, alkylamidoalkylammonium, trialkylbenzylammonium, trialkylhydroxyalkylammonium or alkylpyridinium chlorides or bromides, imidazoline derivatives or amine oxides of cationic nature. An example of a cationic surfactant is cetrimonium chloride or bromide (INCI);

The surfactants used according to the present invention may be block copolymers comprising at least one hydrophilic block and at least one hydrophobic block different from the hydrophilic block, which are advantageously obtained according to a polymerization process in which:

(a$_0$) at least one hydrophilic (respectively hydrophobic) monomer, at least one source of free radicals and at least one radical polymerization control agent of the —S(C=S)— type are brought together within an aqueous phase;

(a$_1$) the polymer obtained on conclusion of stage (a$_0$) is brought into contact with at least one hydrophobic (respectively hydrophilic) monomer different from the monomer employed in stage (a$_0$) and at least one source of free radicals, via which a diblock copolymer is obtained.

Polymers of the triblock type, or comprising more blocks, can optionally be obtained by carrying out, after stage (a$_1$), a stage (a$_2$) in which the polymer obtained on conclusion of stage (a$_1$) is brought into contact with at least one monomer different from the monomer employed in stage (a$_1$) and at least one source of free radicals; and more generally by carrying out (n+1) stages of the type of the abovementioned stages (a$_1$) and (a$_2$) and n is an integer typically ranging from 1 to 3, where, in each stage (a$_n$), with n≥1, the polymer obtained on conclusion of stage (a$_{n-1}$) is brought into contact with at least one monomer different from the monomer employed in stage (a$_{n-1}$) and at least one source of free radicals. Use may be made, for example, according to the invention, of the copolymers of the type which are described in WO03068827, WO03068848 and WO2005/021612.

Preferably, in step (E), the molar ratio, denoted "non-amphoteric/surfactant" molar ratio, corresponding to the ratio of the total amount (zero or non-zero) of non-amphoteric surfactants relative to the total amount of surfactants, which are amphoteric and non-amphoteric as appropriate, is in general less than 50%, or even less than 30%. According to one specific embodiment, the "non-amphoteric/surfactant" ratio is less than 10% or even zero.

Use of the Polymer Compositions of the Invention

The polymer compositions obtained according to a process comprising step (E) of the invention and the polymers which they comprise are, inter alia, of use for regulating the rheology of liquid media, in particular of aqueous media. They may also be used as associative thickeners, as viscosity enhancers, gelling agents or surface modifiers, or for making nanohybrid materials. They may also be used as vectorizing agents.

In this context, the polymer compositions and polymers according to the invention may especially be used for thickening or adapting the rheology of a very large number of compositions, for example of compositions for conveying cosmetic, pharmaceutical, veterinary or plant-protection principles, or alternatively detergent principles, for example. Thus, the polymer compositions and polymers according to the invention may be used, for example, for modifying the rheology of a cosmetic composition, of a household product, of a detergent composition or else of a formulation intended for the agricultural field.

More specifically, the polymer compositions and polymers as obtained according to the invention prove to be advantageous as rheology regulators in the field of oil and natural gas extraction. They may be used in particular for making drilling fluids, for fracturing, for stimulation and for enhanced oil recovery.

In the field of enhanced oil recovery, the polymer compositions and polymers as obtained according to the process of the invention generally have rapid hydration capacity and also good injectivity and shear stability properties, especially given the controlled nature of the polymerization, which leads to batches of polymers of homogeneous composition and structure, with polydispersity indices that are lower than those of "uncontrolled" systems.

Moreover, the nature of the polymers that may be synthesized according to the present invention is extremely modulable, which permits a very wide choice both on the backbone and on the presence of substituents, which may be judiciously chosen as a function of the envisioned uses of the polymer.

For example, for use in EOR, it is advantageous for the constituent monomers of the polymer to give it resistance to high temperature. To this end, the polymers intended for use in EOR may be, for example, of the type obtained from monomers chosen from acrylamido, methacrylamido, vinyl or allylic monomers. Il n'est généralement pas intéressant d'utiliser les acrylates ou methacylates a cause de leur sensibilité a l'hydrolyse.

By way of example, in order to improve the heat stability of the backbone, use may be made of monomers, such as N-methylolacrylamide, dimethylacylamide, N-morpholineacrylamide, vinylpyrrolidone, vinylamide, acrylamido derivatives such as AMPS or APTAC, sodium sytrene sulfonate and derivatives thereof, or alternatively sodium vinyl sulfonate. According to one specific embodiment, well suited to applications in the EOR field, the polymers have functionalities which further ensure better resistance to salts and which counteract the effects of loss of viscosity, often encountered in EOR in the absence of such functionalities on the polymer. Polymers according to the invention that are particularly stable with respect to salts may in particular be synthesized by performing one or more of the following methods:

- use of additional monomers of sodium 3-acrylamido-3-methylbutanoate type (for example according to the technique described in U.S. Pat. No. 4,584,358);
- use of additional monomers of sulfonic acid or sulfonate type, for instance AMPS (acrylamidomethylpropanesulfonic acid), and salts thereof (especially sodium salts), or else styrenesulfonate and salts thereof;
- the polymers prepared may be of polyampholytic type with a hydrophilic backbone comprising a mixture (i) of monomer units bearing at least one negative charge (for example sulfonates of the abovementioned type); and (ii) of monomer units bearing at least one positive charge (for example APTAC, MAPTAC, DiQuat, (methacryloamidopropylpentamethyl-1,3-propylene-2-olammonium dichloride), DADMAC (diallyldimethylammonium chloride), N-vinylformamide (amine precursor that is cationizable after hydrolysis), or else vinylpyridine or a quaternized derivative thereof);
- use of additional monomers of sulfobétaine type, for instance sulfopropyl dimethylammonium propyl acrylamide, sulfopropyl dimethylammonium propyl methacrylamide (SPP), sulfohydroxypropyl dimethyl ammonium propyl methacrylamido (SHPP), 2-vinyl (3-sulfopropyl) pyridinium betaine, 4-vinyl (3-sulfopropyl) pyridinium betaine, 1-vinyl-3-(3-sulfopropyl) imidazolium betaine, or alternatively sulfopropyl methyl diallyl ammonium betaine.

The polymer compositions obtained according to a process comprising step (E) of the invention, which comprise the polymers and the surfactants used in the micellar polymerization, have the specificity of having good water solubility, this being including in the presence of large amounts of salts. Thus, typically, the polymer compositions obtained according to the invention can be dissolved, without precipitation or formation of cloudiness, in an aqueous solution comprising more than 50 g/l, for example more than 100 g/l or even more than 150 g/l of salts, said composition possibly in particular comprising up to 200 g/l, or even up to 300 g/l of salts. This dissolving of the polymer compositions according to the invention without precipitation or cloudiness is generally obtained even if the composition includes more than 1% of cations, or even more than 2% or even 4% of divalent cations.

The polymer compositions of the invention thus prove to be very good candidates for use in very saline seawater or else in concentrated brines used in certain oil exploitation operations.

Various aspects and advantages of the invention will be further illustrated by the examples below, in which polymers were prepared according to the process of the invention.

EXAMPLES

Example 1 (Comparative)

Synthesis of a Polymer P1 in the Presence of SDS 144 g of sodium dodecyl sulphate (SDS), 565.67 g of distilled water and 10.33 g of 4-tert-butylstyrene (t-BS) were introduced, at 20° C., into a plastic flask (HDPE, 1000 ml). The mixture was stirred using a magnetic stirrer bar for 1 hour, until a clear micellar solution was obtained.

320.1 g of the micellar solution previously prepared, 376.9 g of water, 592.8 g of acrylamide (aqueous solution at 50% by weight), 478 g of AMPS (aqueous solution at 51% by weight), 5.56 g of Rhodixan A1 (ethanolic solution at 1.0% by weight) and 8.94 g of ammonium persulfate (aqueous solution at 5% by weight) were introduced, at 20° C., into a Dewar flask (3000 ml) fitted with a lid which allows it to be atmosphere-tight. The mixture was degassed by bubbling with nitrogen for 40 minutes. 17.7 g of sodium formaldehyde sulfoxylate, in the form of an aqueous solution at 1% by weight, were added to the medium, in a single portion. The mixture was degassed by bubbling with nitrogen for 15 minutes.

The polymerization reaction was then allowed to take place, with stirring. When the viscosity of the medium increased, the stirring was stopped and the polymerisation reaction was allowed to take place overnight. At the end of the polymerization, a gel was obtained.

Example 2

Synthesis of a Polymer P2 in the Presence of Mackam LAB 128.8 g of Mackam LAB at 30%, 145.18 g of distilled water and 2.28 g of 4-tert-butylstyrene (t-BS) were introduced, at 20° C., into a plastic flask (HDPE, 1000 ml). The mixture was stirred using a magnetic stirrer bar for 1 hour, until a clear micellar solution was obtained.

247.1 g of the micellar solution thus prepared, 447.8 g of water, 593.8 g of acrylamide (aqueous solution at 50% by weight), 478.7 g of AMPS (aqueous solution at 51% by weight), 5.57 g of Rhodixan A1 (ethanolic solution at 1.0% by weight) and 9 g of ammonium persulfate (aqueous solution at 5% by weight) were introduced, at 20° C., into a Dewar flask (3000 ml) fitted with a lid which allows it to be atmosphere-tight. The mixture was degassed by bubbling with nitrogen for 40 minutes. 18 g of sodium formaldehyde sulfoxylate, in the form of an aqueous solution at 1% by weight, were added to the medium, in a single portion. The mixture was degassed by bubbling with nitrogen for 15 minutes.

The polymerization reaction was then allowed to take place, with stirring. When the viscosity of the medium increased, the stirring was stopped and the polymerisation reaction was allowed to take place overnight. At the end of the polymerization, a gel was obtained.

Example 3

Synthesis of a Polymer P3 in the Presence of Mackam CET 122.87 g of Mackam CET, 45.77 g of distilled water and 11.36 g of 4-tert-butylstyrene were introduced, at ambient temperature (20° C.), into a 500 ml HDPE flask. The mixture was stirred using a magnetic stirrer bar for 30 minutes, until a clear solution was obtained.

72.8 g of the micellar solution thus prepared, 623.8 g of water, 592.8 g of acrylamide (aqueous solution at 50% by weight), 478.0 g of AMPS (aqueous solution at 50% by weight), 5.568 g of Rhodixan A1 (O-ethyl S-(1-methoxycarbonyl)ethyl xanthate-ethanol solution at 1.0% by weight) were introduced, at 20° C., into a Dewar flask (3000 ml) fitted with a lid which allows it to be atmosphere-tight.

The pH (initial pH=7.9) of the monomer solution was measured and adjusted to 6 by adding a hydrochloric acid solution (aqueous solution at 10% by weight).

The mixture was degassed by bubbling with nitrogen for 60 minutes. Following this degassing, 18.0 g of sodium formaldehyde sulfoxylate, in the form of an aqueous solution at 1% by weight, and 9.0 g of sodium persulfate (aqueous solution at 5% by weight), were added to the medium, in a single portion. The mixture was pre-degassed by bubbling with nitrogen for 15 minutes.

The polymerization reaction was then allowed to take place with stirring for 16 hours, as a result of which the polymer P3 was obtained in the form of a gel.

Example 4

Solubility Tests

The solubility of the P1 and P2 polymer compositions were tested in a brine S consisting of an aqueous solution of the following salts:
- NaCl: 119.54 g/l
- $CaCl_2$: 9.92 g/l
- $MgCl_2$: 6.02 g/l
- $Na_2SO_4$: 2.85 g/l A piece of gel (respectively of P1 or P2) was placed in a 100 ml glass flask, and the brine was added so as to obtain a solution in which the concentration of polymer (P1 or P2, respectively) is 2 g/l. The mixture was stirred using a magnetic stirrer bar for 12 h.

The appearance of the compositions in the flask was visually verified after 12 hours of stirring:

Polymer P1 in the Brine S after 12 h of Stirring (Comparative):
  presence of pieces of the initial gel, slightly swollen and with a whitish appearance Polymer P2 in the Brine S after 12 h of Stirring:
  transparent homogeneous solution

Example 5

Rheology 0.3973 g of P3 polymer gel as obtained at the end of example 3 was placed, with a magnetic stirring bar, in a 100 ml glass flask, to which were added 59.2041 g of a brine with the following composition:

| | |
|---|---|
| NaCl | 119.54 g/l |
| $CaCl_2$ | 9.92 g/l |
| $MgCl_2$ | 6.02 g/l |
| $Na_2SO_4$ | 2.85 g/l |

The mixture was left to stir on a magnetic stirrer plate for 48 h.

The viscosity was then measured as a function of the shear rate using an ARG2 rheometer from TA Instruments, equipped with a 14-15 mm aluminum Couette geometry.

A viscosity of 7.3 mPa·s is obtained at 25° C. for a shear rate of 10 $s^{-1}$.

The invention claimed is:

1. A process for preparing a block copolymer, the process comprising a step (E) of micellar radical polymerization comprising placing the following in contact, in an aqueous medium (M):
   hydrophilic monomers, dissolved or dispersed in said aqueous medium (M);
   hydrophobic monomers in the form of a micellar solution containing, in dispersed form in the aqueous medium (M), micelles comprising the hydrophobic monomers, wherein the hydrophobic monomers comprise t-butylstyrene;
   at least one radical polymerization initiator,
   wherein said micelles comprise at least one surfactant of amphoteric nature.

2. The process as claimed in claim 1, wherein the amphoteric surfactant is selected from the group consisting of:
   betaines;
   sulfobetaines;
   alkylamphoacetates and alkylamphodiacetates;
   alkylamphopropionates or alkylamphodipropionates;
   alkyl amphohydroxypropyl sultaines;
   iminopropinates;
   alkyl amine oxides; and
   mixtures of surfactants comprising one or more of the abovementioned compounds.

3. The process as claimed in claim 2, wherein the amphoteric surfactant is selected from the group consisting of:
   cetyl betaine;
   sulfobetaines;
   alkylamphoacetates and alkylamphodiacetates;
   alkylamphopropionates or alkylamphodipropionates;
   alkyl amphohydroxypropyl sultaines;
   iminopropinates;
   lauramine oxide; and
   mixtures of surfactants comprising one or more of the abovementioned compounds.

4. The process as claimed in claim 1, wherein the hydrophobic monomers of step (E) comprise a $C_1$-$C_{30}$ alkyl α,β-unsaturated ester.

5. The process as claimed in claim 4, wherein the hydrophobic monomers of step (E) comprise a $C_4$-$C_{22}$ alkyl α,β-unsaturated ester.

6. The process as claimed in claim 5, wherein the hydrophobic monomers of step (E) comprise lauryl methacrylate.

7. The process according to claim 1, wherein the at least one radical polymerization initiator is water-soluble or water-dispersible.

8. The process according to claim 1, comprising placing the following in contact, in the aqueous medium (M):
   hydrophilic monomers, dissolved or dispersed in said aqueous medium (M);
   hydrophobic monomers in the form of a micellar solution;
   at least one radical polymerization initiator, and
   at least one radical polymerization control agent, wherein said micelles comprise at least one surfactant of amphoteric nature.

9. The process as claimed in claim 8, wherein the radical polymerization control agent is a compound which comprises a thiocarbonylthio —S(C=S)— group.

10. The process according to claim 9, wherein the thiocarbonylthio —S(C=S)— group is a xanthate.

11. The process as claimed in claim 8, wherein the radical polymerization control agent is an oligomer which is of water-soluble or water-dispersible nature bearing a thiocarbonylthio —S(C=S)— group and which
- is soluble or dispersible in the aqueous medium (M) used in step (E); and/or
- is not suitable for penetrating into the micelles of the micellar solution.

12. The process as claimed in claim 11, wherein the radical polymerization control agent is a prepolymer bearing at least one thiocarbonylthio —S(C=S)— group obtained on conclusion of a step $(E^0)$, prior to step (E), said step $(E^0)$ comprising placing in contact
- hydrophilic monomers;
- a radical polymerization initiator; and
- a control agent bearing a thiocarbonylthio group —S(C=S)—.

13. The process according to claim 12, wherein the hydrophilic monomers of step $(E^0)$ are identical to those of step (E).

14. A polymer composition obtained according to the process of claim 1.

15. A method comprising regulating rheology of a liquid medium by dissolving in the liquid medium the polymer composition or the polymer contained in the polymer composition as claimed in claim 14.

16. The method as claimed in claim 15, wherein said polymer composition is dissolved in an aqueous medium comprising more than 50 g/l of salt.

17. The method according to claim 15, wherein the liquid medium is an aqueous medium.

18. The method according to claim 17, wherein the aqueous medium is for oil or natural gas extraction.

* * * * *